United States Patent [19]

Lovaas

[11] Patent Number: 4,741,570
[45] Date of Patent: May 3, 1988

[54] VEHICLE BED COVER ASSEMBLY

[75] Inventor: Ann B. Lovaas, Crystal River, Fla.

[73] Assignee: ABL Unlimited, Inc., Brooksville, Fla.

[21] Appl. No.: 36,987

[22] Filed: Apr. 10, 1987

Related U.S. Application Data

[63] Continuation-in-part of Ser. No. 933,483, Nov. 21, 1986.

[51] Int. Cl.[4] .............................................. B60J 7/10
[52] U.S. Cl. .................................................. 296/100
[58] Field of Search .................. 296/100, 216; 49/254, 49/234, 235

[56] References Cited

U.S. PATENT DOCUMENTS

| | | | |
|---|---|---|---|
| 2,853,340 | 9/1958 | Hershberger | 296/100 |
| 3,165,352 | 1/1965 | Hallock et al. | 296/100 |
| 3,342,523 | 9/1967 | Lutgen | 296/100 |
| 3,640,565 | 2/1972 | Anderson | 296/100 |
| 4,068,886 | 1/1978 | Gostomski | 296/100 |

Primary Examiner—Robert R. Song
Attorney, Agent, or Firm—Pettis & McDonald

[57] ABSTRACT

A cover assembly for a vehicle bed includes a plurality of rigid, telescoping cover members longitudinally movable on slide assemblies engaging guide track members mounted along the side of the vehicle bed with latching apparatus for releasably securing the respective cover members extending over the front end and the rear end of the vehicle bed to permit opening of the cover to expose either the front portion or the rear portion of the vehicle bed, or both such portions.

20 Claims, 3 Drawing Sheets

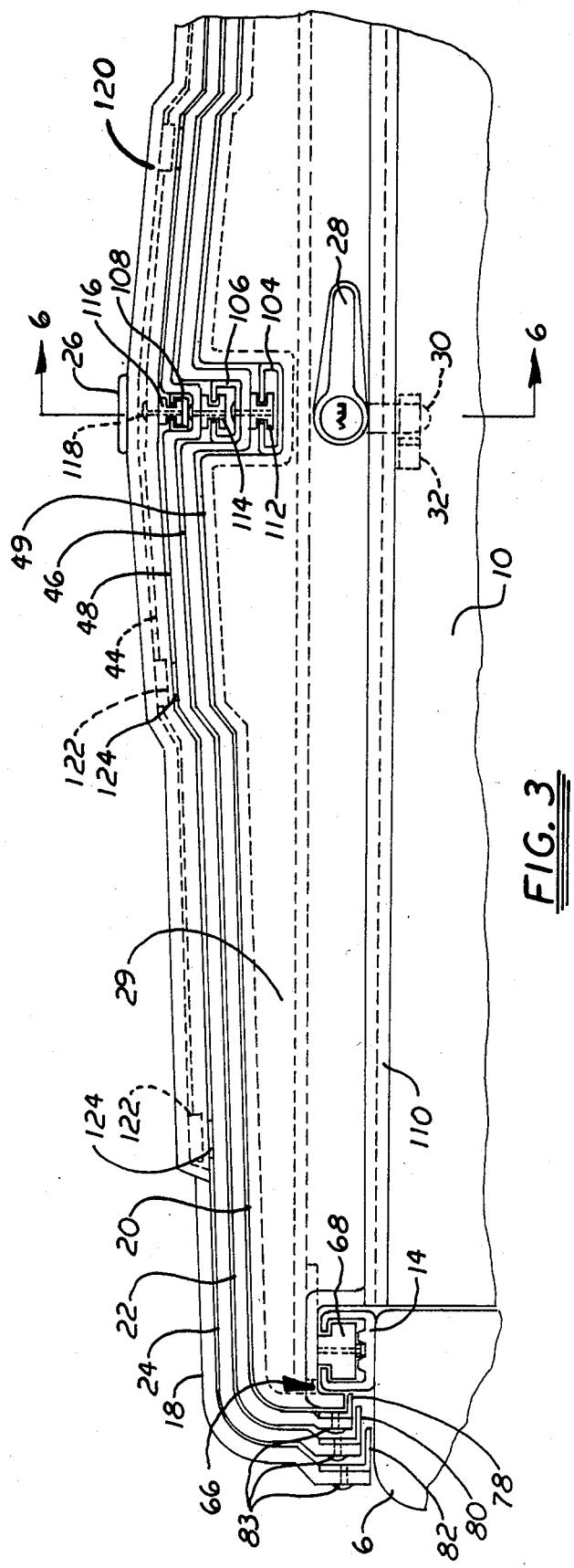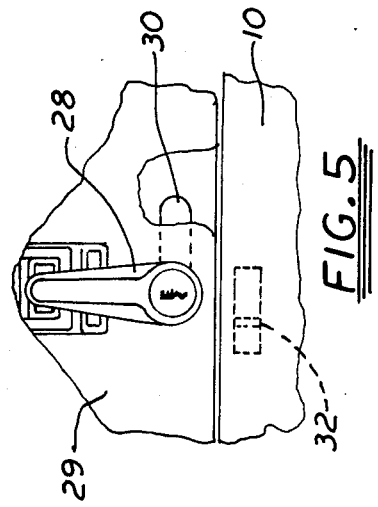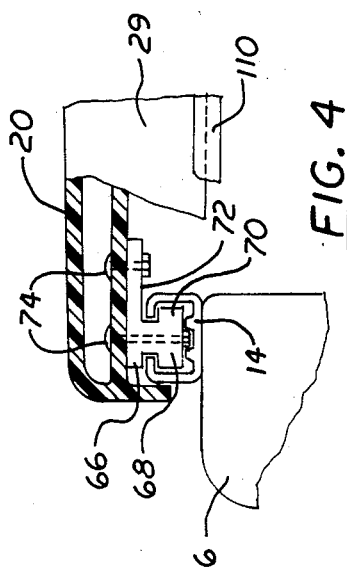

VEHICLE BED COVER ASSEMBLY

RELATED APPLICATION

This application is a continuation-in-part of application Ser. No. 933,483, filed Nov. 21, 1986.

BACKGROUND OF THE INVENTION

This invention relates to the field of cover assemblies for vehicles having open beds, such as pickup trucks or similar vehicles. More particularly, the invention relates to the field of substantially rigid covers for such vehicles, which covers are formed of a plurality of relatively movable segments. Still more particularly, this invention relates to such covers that include means for releasably latching portions thereof in any of a plurality of predetermined positions, covering or exposing portions of the vehicle bed.

Various types of vehicle bed cover assemblies have been known in the past. These have included flexible covers affixed by snaps or other fasteners around the uppermost extremities of the sides of the vehicle bed, rigid covers hingedly attached to the vehicle bed and various types of sliding or telescoping covers. Exemplary of the rigid telescoping cover assemblies of the prior art is U.S. Pat. No. 3,640,565 to Anderson. In this prior art patent a forward segment of the cover assembly is rigidly affixed to the forward portion of the vehicle bed and a rear section is slidably movable between an extended position covering the vehicle bed and a retracted position beneath the fixed segment. While such a prior art device provides several improvements over the soft type of covers or the hinged covers, it has provided substantial inconvenience in blocking access to the forward portion of the vehicle bed.

SUMMARY OF THE INVENTION

To overcome various of the disadvantages of the prior art cover assemblies noted above, it is an object of the present invention to provide such a cover assembly that may be slidably openable from either the front end or the rear end of the vehicle bed. It is another object of this invention to provide such a cover assembly in which at least certain of the segments are releasably latchable in any of a plurality of positions, selectively uncovering the front or rear portions of the vehicle bed, or both such front and rear portions. To achieve these and other objects that will become apparent to those skilled in the art, the present invention provides a telescoping cover assembly formed of a plurality of substantially rigid cover members, a pair of guide track members for guiding the longitudinal movement of the cover members and releasable latching means affixed to the respective cover members extending over the front and rear ends of the vehicle bed. Each of the cover members extends transversely beyond the longitudinal edges of the vehicle bed, and each longitudinally overlaps and is longitudinally movable relative to another, with a first such cover member being releasably latchable in a position covering the front end of the vehicle bed and the second cover member being releasably latchable in a position covering the rear of the vehicle bed. One each of the guide track members is affixed to the vehicle adjacent and longitudinally parallel to each lateral side of the vehicle bed for guiding the longitudinal movement of the cover members. Affixed to each such cover member are at least two support slide assemblies with one each of the support slide assemblies engaging each such guide track member to provide sliding support for the longitudinal movement of the cover member.

DESCRIPTION OF THE DRAWINGS

Particularly preferred embodiments of the apparatus of this invention will be described in detail below in conjunction with the drawings in which:

FIG. 3 is a fragmentary rear elevational view of the cover assembly of FIG. 1;

FIG. 4 is a fragmentary rear elevational view, partially in section of the cover assembly of FIG. 1;

FIG. 5 is another fragmentary rear elevational view of the cover assembly of FIG. 1 illustrating operation of the latching handle;

DETAILED DESCRIPTION OF PREFERRED EMBODIMENTS

Figure 1:
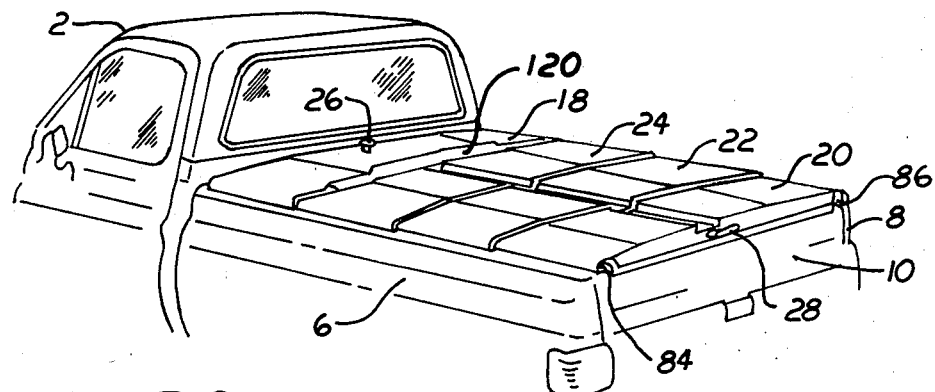
FIG. 1 is a perspective view of an embodiment of the vehicle bed cover assembly of this invention installed on a pickup truck type vehicle, with the cover members shown in their extended, bed covering positions.
Figure 2:
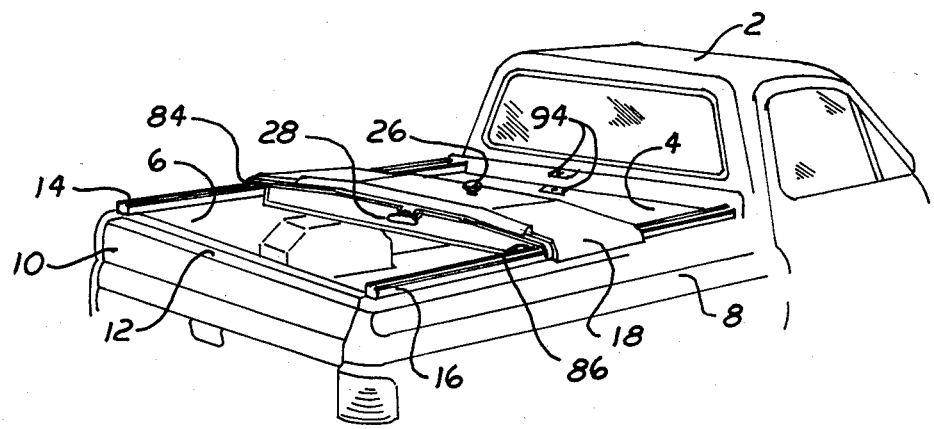
FIG. 2 is a perspective view of the cover assembly of FIG. 1 in which the individual cover members are telescopically retracted to uncover selected portions of the vehicle bed.

The principal components of the telescoping vehicle bed cover assembly of this invention are illustrated in the perspective views of FIGS. 1 and 2. FIG. 1 illustrates the telescoping vehicle bed cover assembly of the invention as installed on a typical vehicle 2, such as a pickup truck. This pickup truck 2 includes an open bed having a front side 4, two generally parallel lateral sides 6 and 8 and a hinged rear gate 10. This rear gate 10 extends between the lateral sides 6 and 8 and includes an upper edge 12 and, spaced therefrom, a lower edge (not shown) hingedly attached to the vehicle.

As shown most clearly in FIG. 2, the telescoping cover assembly of this apparatus includes a pair of guide track members 14 and 16, described in greater detail below, each affixed to the vehicle adjacent and longitudinally parallel to the respective lateral sides 6 and 8 of the vehicle bed. These guide track members 14 and 16 provide for guiding longitudinal movement of the individual cover members. The cover members include a first cover member 18, shown in FIG. 1 covering the front portion of the vehicle bed, second cover member 20 shown in FIG. 1 covering the rear portion of the vehicle and intermediate cover members 22 and 24. While the illustrated embodiment includes a total of four such cover members, it is to be understood that the apparatus of this invention may include any number of such cover members greater than one, depending largely upon the length of the vehicle bed to be covered. Practical considerations of fabrication techniques and material strength will largely determine the number of such cover members to be utilized for a given length of bed. These cover members 18 through 24 may be formed of any suitable, substantially rigid, material, such as metal or syntetic resins. Conveniently, the cover members may be formed by injection molding or by vacuum forming of a synthetic resin such as ABS (acrylonitrile-butadiene-styrene) or polypropylene, or by layup of glass fiber matting and corresponding appropriate resins.

As shown in FIGS. 1 and 2, each adjacent pair 18 and 24, 22 and 24, and 20 and 22 of such cover members is configured such that one such adjacent cover member is telescopically receivable over the other adjacent cover member. This permits the telescopic retraction or collapsing of the cover members shown in FIG. 2 to uncover most of the vehicle bed for access. As will be described in greater detail below, the first cover member 18 is provided with releasable latching means, of which the actuating handle 26 is shown on FIGS. 1 and 2. This first releasable latching means provides for releasably latching the first cover member 18 in the position shown in FIG. 1 covering the front portion of the vehicle bed and, upon release, provides for moving that first cover member 18 longitudinally to the rear to expose the front portion of the vehicle bed, as shown in FIG. 2. A second releasable latching means, of which the handle 28 is shown in FIGS. 1 and 2, is provided, affixed to the second cover member 20, for releasably latching that cover member in a position covering the rear of the vehicle bed.

FIGS. 3-7 illustrate on a larger scale and in greater detail the structural features of the cover assembly of this invention. The releasable latching arrangement for the second cover member 20 is shown in detail in FIGS. 3, 5, and 6. This second latching assembly or means includes a conventional locking handle, such as L-shaped handle 28, which is rotatably affixed to the second cover member 20. Attached to the portion of the handle 28 that is within second cover member 20 is latching finger 30, which is configured and positioned to engage the latch finger receiver 32 that preferably is affixed to the rear gate 10 of the vehicle. Interengagement between the latch finger 30 and the receiver 32 thus prevents movement of the cover member 20 and latches that member in its position covering the rear of the vehicle bed.

Figure 6:
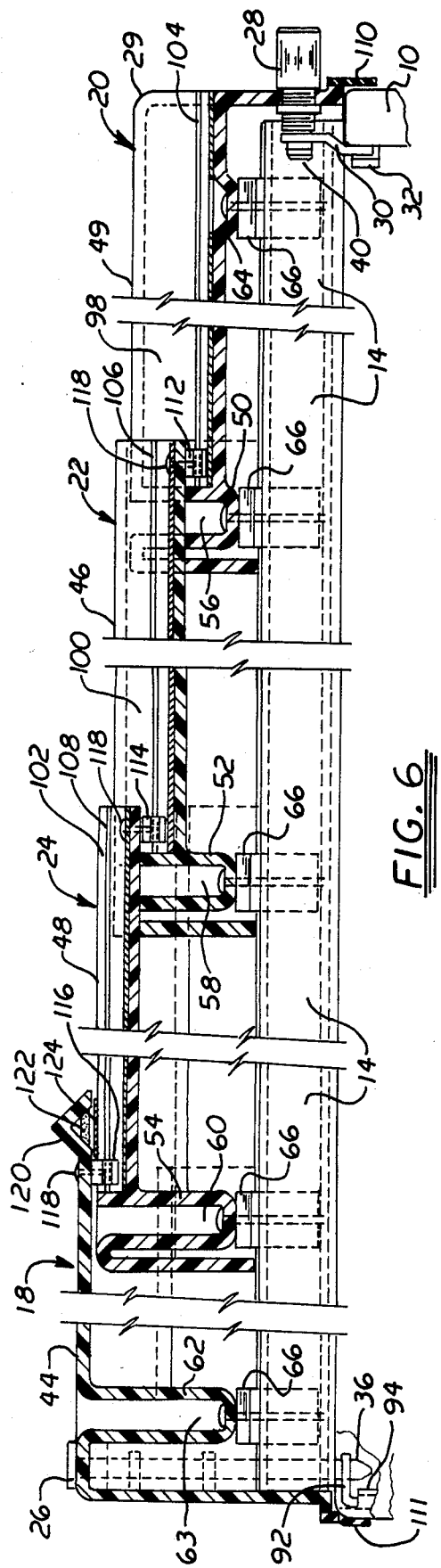
FIG. 6 is a side sectional view of the cover assembly of FIG. 3, taken along line 6—6.

In FIGS. 3, 4 and 6 are illustrated portions of the left-hand side of this cover assembly. It is to be understood that, in this preferred embodiment, the structures of the left and right hand sides of the apparatus are substantially mirror images of one another with respect to a vertical plane extending longitudinally through the center of the cover assembly.

The construction of the second cover member 20 and the other cover members of this preferred embodiment of the assembly is shown in more detail in the sectional view of FIG. 6. Each of the cover members, such as cover member 18, is formed with at least one hipped portion such as portion 44 on member 18. Corresponding hip portions 46, 48 and 49 extend longitudinally in the center of cover members 22, 24 and 20 respectively. These hipped portions provide additional strength to the cover members and also include track and guide structure, described below, to provide for interengagement between the cover members to control relative movement thereof.

On the cover members 20, 22, 24 and 18 and extending transversely adjacent the front end of each of those members are reinforcing ribs 50, 52, 54 and 62 respectively. These ribs 50, 52, 54 and 62 are shown most clearly in the side sectional view of FIG. 6. Preferably, each of these ribs is generally U-shaped in cross section so that the respective center portions or slots of the U may serve as a rain gutter to carry out to the lateral edges of the cover member any water from rain or other sources that may run toward the front of each such cover member, thus preventing such water from entering the bed of the truck. It is to be understood that each of the rain gutter slots 56, 58, 60 and 63 in the respective ribs 50, 52 and 54 extend all the way to the outermost edge of their respective cover members, so that the rain will be carried out beyond the guide track members 14 and 16 so that any water or other liquid entering those gutter slots will be directed outside the guide tracks 14 and 16 to run off the lateral sides 6 and 8 of the vehicle.

In addition to these trough-like rib members 50, 52, 54 and 62 on cover members 20, 22, 24 and 18, respectively, there also may be provided an additional transverse strengthening rib 64 adjacent the rear of second cover member 20. In addition to providing additional strength to the cover members, these transversely extending rib members also may provide the attachment points for support slide assemblies 66 that slidingly support the cover members for the desired longitudinal movement. The support slide assemblies 66 engage the respective guide track members 14 and 16, conveniently in the manner illustrated in FIGS. 3, 4 and 6. In FIGS. 3 and 4 are illustrated one of the support slide assemblies that is typical of each of the slide assemblies shown. This slide assembly 66 includes support slide 68, suitably formed of a low-friction synthetic resin such a Nylon or Teflon, mounted by pins, bolts or other suitable fasteners 74 to the respective rib member, such as rib 64. Slide 68 is received within the guide track member 14 preferably in the manner illustrated in FIG. 3. In this embodiment the guide track is in the form of a square or rectangular channel having a ribbed bottom and two full sides with partial top sides leaving open a slot along the top through which a portion of the slide 68 extends. Preferably, this slide 68 also includes an enlarged portion 70 that is wider in the transverse or lateral direction than the width of the slot in the top of track member 14. This provides means for interlocking the slide assembly with its respective guide track member to prevent lifting away from the track member of the cover member to which the slide assembly is attached, effectively capturing the slide assembly and the cover member.

As shown most clearly in the fragmentary sectional view of FIG. 4, each slide 68 preferably is formed with an enlarged portion 72 located above the guide track 14 to serve as an additional support for possible engagement between slide assembly 66 and guide track 14. A suitably close fit between the enlarged portion 70 and the upper portion 72 of the slide 68 and the thickness of the uppermost portion of the guide track 14 will also restrain the cover members against rattling.

To accommodate vehicle beds of differing widths means may be provided for locating at least one and preferably both support slide assemblies 66 on each cover member at any of a plurality of predetermined positions spaced transversely from the longitudinal center line of the cover assembly. These means may conveniently take the form of either premarked locations for holes through which the pin 74 may be inserted through rib member 64 or by predrilled holes. These markings or holes are provided at locations that will accommodate the various popular widths of vehicle beds.

FIG. 3 also illustrates one preferred configuration for the lateral edges of the cover members. This preferred embodiment illustrates a cover assembly formed preferably by vacuum forming. The transverse extremities or outermost edges of second cover member 20, shown in section curve downwardly and end below the upper level of the track member 14 (and 16 on the opposite side). Adjacent cover member 22 is configured and dimensioned to extend over and around the outer edge of second member 20. The transverse extremity of cover member 22 includes lip means 78 extending under the lowermost portion of the outer edge of cover member 20. Such lip means 78 may be formed either by molding, or, preferably as shown in FIG. 3, by affixing a material such as an aluminum angle to the lowermost portion of cover member 22. Likewise, cover member 24 extends around and over cover member 22 and includes lip means 80 extending around and beneath the lower lip 78 of cover member 22. First cover member 18 extends around and over the outer extremities of cover member 24 and includes lip means 82 extending under the lip 80 of cover member 24. Preferably each of the lip means 78, 80 and 82 are formed in the manner set forth above and, where formed of aluminum angle, may be affixed to the respective cover members by conventional means such as rivets 83. These lips 78, 80 and 82 and this overlapping configuration help prevent entry of dirt and water into the space between the cover members and also provide additional interengagement between the edges of the respective adjacent cover members to further strengthen the cover members and restrict relative vertical movement between adjacent cover members.

As shown most clearly in FIGS. 1 and 2, second cover member 20 includes at its rear corners openings 84 and 86 that are dimensioned to fit around the respective guide track members 14 and 16 to permit longitudinal movement of that cover member 20 toward the front of the vehicle bed without interference with the track members. As shown on FIG. 7, around these apertures 84 and 86 are formed flared lips 88 and 90 (not shown) which serve to deflect any rainwater or other runoff outwardly away from the aperture and thus reduce the likelihood of rainwater entering the vehicle bed. Similar flared lips 89 and 91 (not shown) may be provided around corresponding apertures in the front end of cover member 18 to provide for rearward sliding of that front cover member 18.

FIG. 6 illustrates most clearly the releasable latching arrangement for the first cover member 18. This latching handle 26, which may be substantially similar to lockable handle 28 on the second member 20, has affixed to it a latching finger 92 that rotates with rotation of the handle 26. This latching finger 92 is releasably receivable into engagement with a hook 94 affixed to the top of the front end 4 of the vehicle bed, as shown in FIG. 2. By engagement between the latching finger 92 and the hook 94 the first cover member 18 prevented from any rearward movement. However, upon release of that latching engagement with hook 94, the first cover panel 18 may then be moved longitudinally of the vehicle bed toward the rear thereof to provide for access to the front portion of the vehicle bed, as shown in FIG. 2.

To provide for secure engagement between the adjacent cover members and to limit rearward movement of one adjacent cover member with respect to an adjacent such cover member, there are provided interengageable means on the cover members, as shown in FIGS. 3 and 6. As noted above, each of the cover members 18, 20, 22 and 24 are provided with the hipped portions 44, 49, 46 and 48, respectively. In the center of these hipped portions of cover members 20, 22 and 24 are formed troughs 98, 100 and 102, respectively. Affixed to the upward facing surfaces of the lowermost portions of each of these troughs 98, 100 and 102 are guide tracks 104, 106 and 108, respectively. Each of these guide tracks 104, 106 and 108 preferably is in the form of a rectangular channel having a bottom and two full sides with partial top sides leaving open a slot along the top, somewhat similar in configuration to the roller guide tracks 14 and 16. Affixed to the cover members 22, 24 and 18 are guide members 112, 114 and 116, respectively. Each of these guide members has the configuration generally of a horizontal letter H and preferably is formed of a low friction synthetic resin, such as Nylon or Teflon. In this configuration each of the guide member 112, 114 and 116 includes a lower enlarged portion and an upper enlarged portion, each substantially larger in transver cross section than the width of the opening in the top of each of the guide tracks 104, 106 and 108. As shown in FIG. 3, the lower enlarged portion is received within the immediately subjacent guide track and thus restrains upward movement of that transversely central portion of each overlying cover member relative to its subjacent cover member. The upper enlarged portion of each such guide member 112, 114 and 116 may engage the upper surface of its respective guide track and thus provide support for each overlying cover member relative to its subjacent cover member. By forming the guide members of a low friction synthetic resin, they provide for easy sliding between the guide tracks and the guide members. Each of these guide members 112, 114 and 116 may be affixed to their respective cover members by a suitable means such as rivets, pins or bolts 118.

As seen in the side section view of FIG. 6, each of the guide members 112, 114 and 116 are fixed to their respective cover members 22, 24 and 18 in positions that place them generally adjacent the forward (left side in FIG. 6) end of the track members 104, 106 and 108 when the cover assembly is in its fully closed position as illustrated. By this positioning the enlarged portion of each guide member that is captured within its respective guide track is closely adjacent the back side of the respective transverse ribs 50, 52 and 54. Engagement between each such guide member and the respective rib will thus prevent each subjacent cover member from moving any further toward the rear of the vehicle bed. This positioning thus secures the cover members against movement in the longitudinal, vertical or transverse direction, while the interlocking arrangement between the supporting slide assemblies and their guide tracks restrains transverse and vertical movement of the edges of the cover members.

Figure 7:
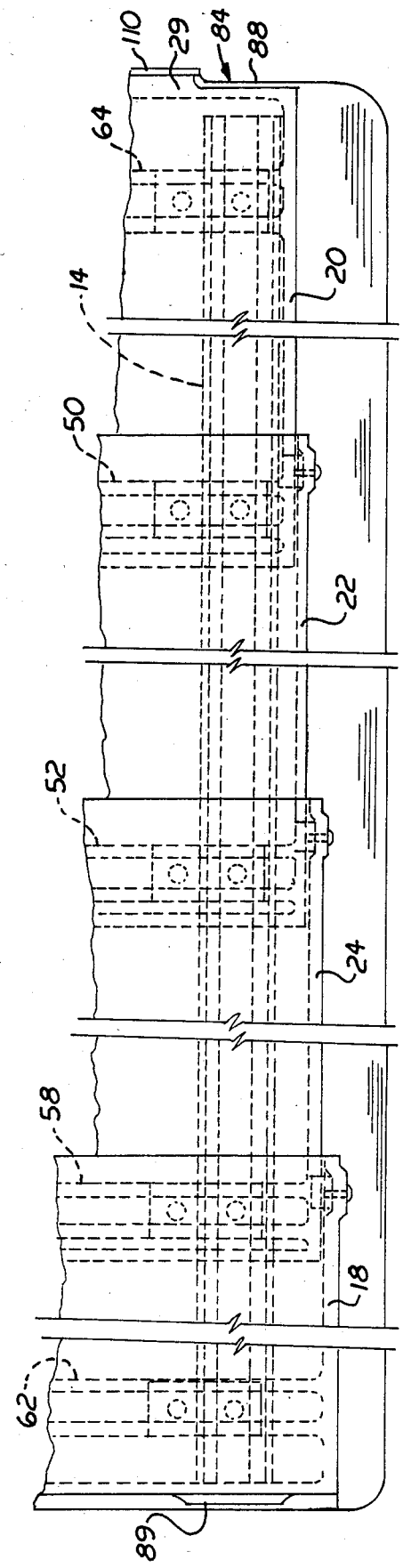
FIG. 7 is a fragmentary top plan view of one side of the cover assembly of FIG. 1.

As shown most clearly in FIGS. 3, 6 and 7, the lowermost portion of the rear section 29 of second cover member 20 preferably has affixed thereto a flexible lip 110 formed of rubber or other resiliently flexible material, thus forming a sealing flap over the rear gate 12 of the vehicle to exclude dirt and rain, while permitting by its flexing the longitudinal movement of cover member 20 relative to the gate 10. A corresponding flexible lip 111 may be affixed to the lowermost portion of the front end of first cover member 18.

When the releasable latching means on the rear panel is activated to withdraw the latching finger 30 from engagement with the hook 32 that second cover member 20 may then be moved forward. By virtue of the slight friction between the slide members 68 and their respective tracks 14, the cover members, while easily moved by hand, will remain in the position where they are placed by the user. Thus, the cover members 20 may be set in any of a plurality of positions either fully covering or partially exposing the rear end of the vehicle bed.

As shown on FIGS. 1 through 3 and 6, first cover member 18 is provided proximal the rear edge thereof with an upwardly extending portion 120 to deflect air passing over that cover member. Such deflection serves to reduce the effects of turbulent air flow that might otherwise cause flutter and rattling of the cover members. Additionally, the first cover member 18 and its adjacent cover member 24 are provided with magnetically interengaging means. Such magnetically interengaging means may comprise a permanent magnetic 122 affixed to the underside of the rear portion of cover member 18 and a magnetically attracted member, such as a bolt or plate 124 affixed to the upperside of that adjacent cover member 24. The attraction between these elements 122 and 124 serves to urge the first cover member 18 and the adjacent cover member 124 toward one another, again serving to reduce any flutter or lifting by the wind.

It may be noted that one advantage of the construction described above for this cover assembly is the suitability for using one set of cover members for a plurality of vehicle bed sizes. Likewise, vehicle beds of differing lengths may be accommodated by simply having greater or lesser overlap between adjacent cover members and accommodating the desired vehicle bed.

Another advantage of the construction described above is that it provides for easy removal of all of the cover members from the vehicle. By simply releasing the latching means securing the front cover member to the front of the vehicle bed and that securing the rearmost cover member to the vehicle bed, the telescoped cover members may easily be slid out the rear end of the track members and stored away from the vehicle, thus opening up the entire bed of the vehicle for use. Correspondingly, the cover members may then be remounted by simply inserting the support slide assembly of the telescoped cover members into the track members and extending the cover to latch the front and rear members in the desired locations.

While the foregoing has described particularly preferred embodiments of the vehicle bed cover assembly of this invention, it is to be understood that this description is illustrative only of the principles of this invention and is not to be considered limitative thereof. Because numerous variations and modifications of this apparatus, all within the scope of the invention, will readily occur to those skilled in the art, the scope of this invention is to be determined solely by the claims appended hereto.

What is claimed is:

1. A telescoping cover assembly for a vehicle bed, comprising:
    a plurality of substantially rigid cover members, each having lateral sides extending transversely beyond the longitudinal edges of the lateral sides of said vehicle bed and each being longitudinally movable relative to another and each overlapping a longitudinally adjacent said cover member, with a first said cover member being releasably fixable in a position covering the front end of said vehicle bed, and a second cover member being releasably fixable in a position covering the rear end of said vehicle bed, at least one cover member of each adjacent pair of cover members comprising a trough portion that extends substantially from the rear of said one cover member to a location proximate the front thereof and intermediate the opposing lateral sides thereof, each adjacent pair of cover members further comprising interengagable means limiting relative movement of said adjacent cover members to a predetermined amount and including an intermediate guide track member and intermediate guide means slidably engageable with said intermediate guide track member, one of said intermediate guide track member and said intermediate guide means being attached to said one adjacent cover member within said trough portion and the other of said intermediate guide track member and said intermediate guide means being attached to the other said adjacent cover member;
    a pair of vehicle bed guide track members, one each affixed to said vehicle adjacent and longitudinally parallel to each lateral side of said vehicle bed for guiding said longitudinal movement of said cover members;
    at least two support slide assemblies affixed to each said cover member, with one each of said support slide assemblies engaging each said vehicle guide track member to provide sliding support for said longitudinal movement of said cover member;
    first releasable latching means affixed to said first cover member for releasably latching said first cover member in a position covering the front end of said vehicle bed, whereby release of said first latching means permits the first cover member to be moved longitudinally of the vehicle along the guide track members to expose the front portion of the vehicle bed; and
    second releasable latching means affixed to said second cover member for releasably latching said second cover member in a position covering the rear of said vehicle bed, whereby release of said second latching means permits the second cover member to be moved longitudinally of the vehicle bed along the guide track members to expose the rear portion of the vehicle bed.

2. The cover assembly of claim 1 wherein each said support slide assembly includes means interlocking with its respective said guide track member to prevent lifting away from said track member of said cover member to which said slide assembly is attached.

3. The cover assembly of claim 1 wherein said second cover member is telescopically receivable under an adjacent said cover member.

4. The cover assembly of claim 1 wherein said first cover member is telescopically receivable over an adjacent said cover member.

5. The cover assembly of claim 4 wherein said first cover member includes proximal the rear edge thereof an upwardly extending portion to deflect upwardly air passing thereover.

6. The cover assembly of claim 4 further comprising magnetically interengaging means affixed to said first cover member and said adjacent cover member for magnetically urging said first cover member and said adjacent cover member toward one another.

7. The cover assembly of claim 1 wherein said interengageable means further comprises means for restraining upward movement of the transversely central portion of the overlying cover member of each said adjacent pair of cover members.

8. The cover assembly of claim 7 wherein said interengageable means further comprises means for supporting said transversely central portion of said overlying cover member for longitudinal sliding movement relative to said adjacent underlying cover member.

9. The cover assembly of claim 1 wherein
each adjacent pair of said cover members is configured such that one said adjacent cover member is telescopically receivable over the other adjacent said cover member, and
each said cover member includes means adjacent the transverse extremities thereof for restricting vertical movement of said cover members.

10. The cover assembly of claim 9 wherein said vertical movement restricting means comprise lip means on said transverse extremity of each said one cover member extending under said transverse extremity of each said other adjacent cover member, whereby the extension of each such lip means under the extremity of the adjacent underlying cover member prevents vertical removal of the overlying cover member from the adjacent underlying such cover member.

11. The cover assembly of claim 1 wherein
said vehicle bed comprises a pickup truck bed having a front side and two longitudinally extending lateral sides and a rear gate extending between said lateral sides and having an upper edge and, spaced therefrom, a lower edge, said gate being hingedly attached to said vehicle adjacent said gate lower edge, and
said second cover member extends above said bed lateral sides and said rear gate and includes a fixed, generally rearmost portion extending downwardly proximal and generally parallel to said gate upper edge when said second cover member is positioned covering the rear end of said vehicle bed.

12. The cover assembly of claim 11 wherein said second cover member further comprises flexible lip means extending downwardly from said second cover member generally rearmost portion to overlie at least a portion of said gate upper edge when said second cover member is positioned covering said vehicle bed rear end.

13. The cover assembly of claim 1 wherein
said vehicle bed comprises a pickup truck bed having a front side and two longitudinally extending lateral sides and a rear gate extending between said lateral sides, with said front side having an upper edge, and
said first cover member extends above said bed lateral sides and said front side and includes a fixed, generally forwardmost portion extending downwardly proximal and generally parallel to said front side upper edge when said first cover member is positioned covering the front end of said vehicle bed, and
said second cover member further comprises flexible lip means extending downwardly from said first cover member generally forwardmost portion to overlie at least a portion of said bed front side upper edge when said first cover member is positioned covering said vehicle bed front end.

14. The assembly of claim 1 wherein said intermediate guide track member is attached to said one adjacent cover member within said trough portion and said intermediate guide means are attached to said other cover member.

15. The assembly of claim 14 wherein said interengageable means further include transverse rib means that comprise a portion of said one adjacent cover member and being engageable with said intermediate guide means to limit rearward movement of said one adjacent cover member relative to said other cover member to a predetermined amount.

16. The assembly of claim 15 wherein said transverse rib means include a drainage channel extending generally transverse to said vehicle bed to carry water entering said channel to at least one transverse edge of said cover member, whereby rain or other water entering the channel from the cover member may be carried to the outer edge of the cover assembly for removal.

17. The assembly of claim 16 wherein the said drainage channel includes a substantially U-shaped cross section.

18. The assembly of claim 1 wherein each said vehicle bed guide track member includes an upwardly facing bottom surface having rib means extending upwardly therefrom and longitudinally of said guide track member such that said engagement of said guide track member by said slide assembly comprises engagement of a lower portion of said slide assembly with an upper portion of said rib means.

19. The cover assembly of claim 1 wherein each adjacent pair of said cover members is configured such that one said cover member is telescopically receivable under the other said adjacent cover member.

20. The cover assembly of claim 1 wherein at least one of said cover members includes a drainage channel extending generally transverse to said vehicle bed to carry water entering said channel to at least one transverse edge of said cover member, whereby rain or other water entering the channel from said cover member may be carried from the outer edge of the cover assembly for removal.

* * * * *